United States Patent [19]

Charbonneau et al.

[11] 4,404,246

[45] Sep. 13, 1983

[54] STORABLE, CROSSLINKABLE PRESSURE-SENSITIVE ADHESIVE TAPE

[75] Inventors: Robert R. Charbonneau, Lake Elmo; Gaylord L. Groff, North St. Paul, both of Minn.

[73] Assignee: Minnesota Mining and Manufacturing Company, St. Paul, Minn.

[21] Appl. No.: 421,151

[22] Filed: Sep. 22, 1982

[51] Int. Cl.$^3$ .................. B05D 5/10; B05D 3/06; C09J 7/02

[52] U.S. Cl. .................. 428/212; 427/54.1; 427/208; 427/208.2; 427/208.4; 428/317.3; 428/317.7; 428/352; 428/355

[58] Field of Search .................. 427/54.1, 207.1, 208, 427/208.2, 208.4; 428/212, 317.1, 317.3, 317.7, 345, 347, 349, 352, 355, 906

[56] References Cited

U.S. PATENT DOCUMENTS

| | | | |
|---|---|---|---|
| Re. 24,906 | 12/1960 | Ulrich | 428/355 |
| 2,925,174 | 2/1960 | Stow | 427/208.4 |
| 2,973,286 | 2/1961 | Ulrich | 427/208.4 |
| 3,284,423 | 11/1966 | Knapp | 526/229 |
| 3,740,366 | 6/1973 | Sanderson et al. | 428/356 |
| 4,077,926 | 3/1978 | Sanderson et al. | 428/355 |
| 4,181,752 | 1/1980 | Martens et al. | 427/54.1 |
| 4,223,067 | 9/1980 | Levens | 428/317.3 |
| 4,286,047 | 8/1981 | Bennett et al. | 430/280 |
| 4,327,147 | 4/1982 | Ou-Yang | 428/355 |
| 4,364,972 | 12/1982 | Moon | 428/355 |

FOREIGN PATENT DOCUMENTS 747341  11/1966  Canada .................. 428/40

*Primary Examiner*—William J. Van Balen
*Attorney, Agent, or Firm*—Cruzan Alexander; Donald M. Sell; Richard E. Brink

[57] ABSTRACT

Pressure-sensitive adhesive tape, the adhesive layer of which is a copolymer of alkyl acrylate such as isooctyl acrylate and an acid such as acrylic acid and which differs from the prior art in its high acid content and by including a small amount of lower-alkoxylated amino formaldehyde condensate as a latent crosslinking agent. The adhesive does not become crosslinked until it is heated. After the tape has been applied and heated to crosslink the adhesive, the resultant bonds have outstanding resistance to peel forces combined with surprisingly good resistance to shear forces, especially at elevated temperatures.

7 Claims, No Drawings

STORABLE, CROSSLINKABLE PRESSURE-SENSITIVE ADHESIVE TAPE

TECHNICAL FIELD

This invention relates to pressure-sensitive adhesive tape, the adhesive layer of which is a copolymer of alkyl acrylate and copolymerizable acid, which copolymer can be crosslinked through its acid groups.

BACKGROUND ART

U.S. Pat. No. Re. 24,906 (Ulrich) concerns a pressure-sensitive adhesive tape, the adhesive of which consists essentially of a copolymer of 88-97 parts of alkyl acrylate and correspondingly 12-3 parts of copolymerizable monomer such as acrylic acid. That acrylate copolymer provides excellent adhesion and holding power and experiences no observable deterioration even after years of storage.

To improve certain properties, the acrylate copolymer adhesive has been crosslinked. U.S. Pat. No. 2,973,286 (Ulrich) teaches that solvent resistance is improved by crosslinking by adding an organic peroxide prior to coating and applying somewhat greater heat than would be necessary merely to dry the coating. U.S. Pat. No. 2,925,174 (Stow) teaches crosslinking the acrylate copolymer by reaction with a polyfunctional compound such as a polyamine, a polyol or a polyepoxide. Because crosslinking substantially reduces tackiness, care may be taken to minimize the crosslinking until after the tape has been applied to its intended use, and then heating completes the crosslinking. The pressure-sensitive adhesive acrylate copolymer of the tape of U.S. Pat. No. 4,286,047 (Bennett et al.) contains oxirane groups which can be activated by ultraviolet radiation to become so highly crosslinked that it becomes substantially tack-free. This permits delicate electronic components to be removed easily from the tape, even though they were difficultly removable before it was crosslinked. U.S. Pat. No. 3,284,423 (Knapp) and U.S. Pat. No. 3,740,366 (Sanderson) also concern crosslinkable pressure-sensitive adhesive acrylate copolymers.

Although it is recognized that crosslinking can improve the adhesive properties of a pressure-sensitive adhesive, it has been necessary to use other types of adhesives such as liquids in many applications where the convenience of a pressure-sensitive adhesive tape would have been highly desirable.

DISCLOSURE OF INVENTION

The present invention concerns an acrylate pressure-sensitive adhesive tape which when crosslinked after being applied has outstanding resistance to peel forces combined with surprisingly high resistance to shear forces, especially at elevated temperatures. The novel tape should be useful for purposes not previously considered suitable for a pressure-sensitive adhesive tape. Although the novel tape is only slightly tacky before being crosslinked and becomes even less tacky after being crosslinked, its uncrosslinked tackiness is sufficient to provide immediate adhesion to most clean surfaces at ordinary room temperatures, and it retains that property after storage at ordinary room temperatures for more than a year. Hence, the crosslinking agent is latent. The novel tape may be used for such purposes as adhering the mounting button of a rear-view automotive mirror to a glass windshield, and the button will remain in place during moderate heating to crosslink the copolymer. Immediately after the heating, a relatively heavy object such as a mirror can be hung from the mounting device. The crosslinked bond affords surprisingly good resistance to the effects of moisture, thus making the novel tape useful for mounting objects onto hydrophilic surfaces such as glass and ceramics in areas subject to high humidity often encountered in lavatories or in the interior of automotive vehicles.

The tape of the present invention comprises a backing and a pressure-sensitive adhesive layer comprising an acrylate copolymer as described in the aforementioned U.S. Pat. No. Re. 24,906, namely a copolymer of (a) acrylic acid ester of nontertiary alcohol, the molecules of which have from 1-14 carbon atoms, at least a major proportion of said molecules having a carbon-to-carbon chain of 4-12 carbon atoms terminating at the hydroxyl oxygen atom, said chain containing at least about one-half the total number of carbon atoms in the molecule, said acrylic acid ester being per se polymerizable to a sticky, stretchable elastic adhesive polymer mass, and (b) at least one copolymerizable monoethylenic monomer selected from the group consisting of acrylic acid, methacrylic acid, and itaconic acid.

Unlike the acrylate copolymer of that patent, the copolymerizable monomer acid comprises from 10 to 25 percent by weight of the total of said monomers (a) and (b), and the adhesive layer includes as a crosslinking agent a lower-alkoxylated amino formaldehyde condensate having $C_{1-4}$ alkyl groups, for example, hexamethoxymethyl melamine (available as "Cymel" 303 from American Cyanamide Co.) or tetramethoxymethyl urea (available as "Beetle" 65 from American Cyanamide Co.) or tetrabutoxymethyl urea ("Beetle" 85). The adhesive of the novel tape is substantially uncrosslinked and hence retains some tackiness until being heated moderately such as at 120° C. for 30 minutes. The alkoxylated crosslinking agent is effective in amounts within the range of about 0.1 to 0.8 percent by weight of the copolymer, preferably 0.4 to 0.6 percent. Above 0.8 percent concentration, there may be excessive crosslinking and loss of resistance to peel forces after crosslinking.

The novel tape is preferably made by a procedure as taught in U.S. Pat. No. 4,181,752 (Martens et al). To do so, a mixture of the aforementioned monomers (a) and (b) and a photoinitiator is partially polymerized by ultraviolet radiation to provide a syrup having a coatable viscosity, e.g., 300 to 20,000 centipoises. After adding the aforementioned alkoxylated condensate, this is coated onto a carrier web, and the coating is exposed to ultraviolet radiation in an inert environment to complete the copolymerization, thus providing a substantially uncrosslinked pressure-sensitive adhesive tape which can immediately be wound upon itself into roll form for storage or shipment. Crosslinking is easily avoided since very little heating is associated with this procedure.

When the novel tape is instead made by coating a solution or dispersion of acrylate copolymer and the alkoxylated condensate onto a carrier web, the heating to drive off volatiles should be controlled to avoid appreciable reaction between the copolymer and the alkoxylated condensate. Hence, highly volatile vehicles are preferred.

Surprisingly, solutions of acrylate copolymer containing the alkoxylated condensate do not thicken during storage at ordinary room temperatures.

If the carrier web has a low-adhesion surface, the novel tape may be used as a transfer tape. When so used, both surfaces of the carrier may have low-adhesion coatings, one of which is more effective than the other. When unwound, the adhesive layer remains wholly adhered to the higher-adhesion surface, from which it can be subsequently removed.

Many prospective uses for the novel tape require fairly thick coatings, e.g., 0.5 to 1.5 mm, because coatings of such thicknesses better conform to rough or uneven surfaces and also provide greater resistance to peel forces. Coatings of such thicknesses can be made in one pass by the procedure of U.S. Pat. No. 4,181,752 (Martens et al.), while solvent and aqueous coating procedures generally require multiple coatings to achieve smooth, uniform adhesive layers of thicknesses exceeding about 0.2 mm.

To enhance immediate adhesion to relatively rough or uneven surfaces, a pressure-sensitive adhesive tape of the invention may have a resilient foam backing as in Canadian Pat. No. 747,341 (Engdahl et al). Such a foam-backed tape with the pressure-sensitive adhesive at one or both surfaces of the foam, may have an overall thickness of 0.1 to 2.0 mm. A dual-coated foam-backed tape may have one pressure-sensitive adhesive layer designed for high adhesion to a certain surface and the other pressure sensitive adhesive layer designed for high adhesion to an object to be adhered to that surface.

Immediate adhesion to relatively rough or uneven surfaces can be achieved by incorporating glass microbubbles into the adhesive layer as taught in U.S. Pat. No. 4,223,067 (Levens). Another technique for achieving immediate adhesion to relatively rough or uneven surfaces is to froth a partially polymerized mixture of photopolymerizable monomers and then to coat the froth onto a carrier web, followed by polymerizing it in situ with ultraviolet radiation in an inert environment.

The highest adhesive and cohesive strengths have been attained in tapes of the present invention when the acrylate monomer (a) includes both a $C_{5-14}$ acrylate and a $C_{1-4}$ acrylate. Preferred as the $C_{5-14}$ acrylate is isooctyl acrylate obtained by esterifying acrylic acid with isooctyl alcohol, a mixture of various isomers of octyl alcohol which is readily available commercially at relatively low prices. Preferred $C_{1-4}$ acrylates are obtained from methyl, ethyl or n-butyl alcohol which also are readily available at reasonable prices. Acrylic acid is the preferred copolymerizable monomer (b), being both low in cost and easily copolymerizable with the acrylates, especially by the procedure of the aforementioned U.S. Pat. No. 4,181,752. Highest adhesive and cohesive strengths have been attained when the acid monomer (b) has comprised 12 to 22 percent by weight of the total monomers (a) and (b).

180° PEEL VALUE

Tape is adhered by its adhesive to a glass plate with four passes of a 4.5 lb. (2-kg) hard rubber roller. After at least a 24-hour dwell, peelback at 180° is measured by attaching the free end of the tape to a scale and moving the glass plate away from the scale at a rate of about 3.8 centimeters per second. The tape may or may not be heated to crosslink the adhesive before being tested.

CLEAVAGE PEEL VALUE

A plastic body side molding is adhered by the adhesive layer of a tape to a painted steel panel and tested as described in Fisher Body Test Method TM 45-88 dated Aug. 25, 1972. In some cases a different substrate was substituted for the painted steel panel.

STATIC SHEAR VALUE

A strip of tape having an aluminum foil backing 0.125 mm in thickness is adhered by its adhesive layer to a stainless steel plate with four passes of a 4.5 lb (2-kg) hard rubber roller with a free end of the tape extending beyond the plate and the adhesive contact area being $\frac{1}{2}$ inch by $\frac{1}{2}$ inch (1.27 cm by 1.27 cm). After either at least a 10-minute dwell or heating to crosslink the adhesive, the plate is placed in an oven at 70° C. and positioned 2° from the vertical to prevent peeling. After 10 minutes in the oven, a one-kg weight is suspended from the free end, and the time is noted at which failure occurs either by the weight falling or by at least 0.3 cm of creep. The test is discontinued if there is no failure after 10,000 minutes.

DYNAMIC SHEAR VALUE

The adhesive layer of a tape is used to bond two steel strips together with a bond area of $\frac{1}{2}$ inch by $\frac{1}{2}$ inch (1.27 cm by 1.27 cm), and this is heated to 120° C. for 30 minutes to crosslink the adhesive. After cooling to room temperature, the bond is tested in shear in an Instron Tensile tester at a jaw separation rate of 1.27 cm per minute.

In the following examples unless otherwise noted, all parts are by weight and all test values are averages of two tests made after crosslinking the adhesive for 30 minutes at 120° C. in contact with the test surface.

EXAMPLE 1

A mixture of 72 parts isooctyl acrylate (IOA), 13 parts of ethyl acrylate (EA), and 15 parts of acrylic acid (AA) was placed in a glass jar together with 0.04 part of 2-phenyl-2,2-dimethoxy acetophenone ("Irgacure" 651) photoinitiator. After purging with $CO_2$, the jar was shaken gently under ultraviolet radiation to provide a partially polymerized syrup of coatable viscosity. After adding a further 0.1 part of the "Irgacure" 651 and 0.4 part of hexamethoxymethyl melamine, the syrup was coated to a thickness of 1.0 mm between 0.05 mm-thick, transparent biaxially-oriented films of polyethylene terephthalate, the facing surfaces of which had been previously treated with a release agent. Exposure of 1200 millijoules of ultraviolet radiation substantially completely polymerized the coating to a pressure-sensitive adhesive state.

The adhesive layer of this pressure-sensitive adhesive tape had a breakaway Cleavage Peel Value of 2300 N/dm and a continuing Cleavage Peel Value of 1300 N/dm. In the same test except substituting for the painted steel panel a panel of rigid polyurethane useful for making automotive body components, the breakaway exceeded 2100 N/dm and the continuing Cleavage Peel Value was 1750 N/dm.

The cohesive strength of the adhesive layer of the Example 1 tape was determined at 23° C. using ASTM Test Method D-3759 (tensile) with the following results.

| | Cohesive Strength (kPa) | Elongation (%) |
|---|---|---|
| Uncrosslinked | 2500 | 840 |
| After 30 min. at 120° C. | 6000 | 715 |
| After 60 min. at 120° C. | 5500 | 675 |
| After 120 min. at 120° C. | 6000 | 675 |

The Static Shear Value of the adhesive layer of the Example 1 tape was less than 15 minutes when uncrosslinked, and more than 10,000 minutes after being crosslinked at 120° C. for 30 minutes.

EXAMPLES 2-6

Pressure-sensitive adhesive tapes were made as in Example 1 except using different monomer proportions, as reported in Table A together with test results.

TABLE A

| | Parts | | | 180° Peel Value | | Dynamic Shear Value |
|---|---|---|---|---|---|---|
| Example | IOA | EA | AA | (ounces/in.) | (N/dm) | (kPa) |
| 1 | 72 | 13 | 15 | 400 | 435 | 2800 |
| 2 | 75 | 10 | 15 | 390 | 430 | 1200 |
| 3 | 65 | 15 | 20 | 200 | 220 | 1500 |
| 4 | 80 | 7.5 | 12.5 | 210 | 230 | 800 |
| 5 | 72.5 | 7.5 | 20 | 140 | 150 | 1100 |
| 6 | 72.5 | 15 | 12.5 | 320 | 350 | 900 |

EXAMPLES 7-13

Pressure-sensitive adhesive tapes were made as in Example 1 except using n-butyl acrylate (BA) instead of ethyl acrylate and various monomer proportions as reported in Table B. Table C reports cohesive strengths (ASTM D-3759) for the same adhesive layers before and after crosslinking.

TABLE B

| | Parts | | | Cleavage Peel Value | |
|---|---|---|---|---|---|
| | | | | Breakaway | Continuing |
| Example | IOA | BA | AA | (N/dm) | (N/dm) |
| 7 | 85 | 5 | 10 | 1300 | 600 |
| 8 | 65 | 25 | 10 | 1100 | 500 |
| 9 | 75 | 5 | 20 | 2300 | 250 |
| 10 | 65 | 15 | 20 | 2400 | 400 |
| 11 | 75 | 15 | 10 | 1000 | 500 |
| 12 | 71⅔ | 11⅔ | 16⅔ | 2500 | 600 |
| 13 | 72 | 13 | 15 | 2300 | 13000 |

TABLE C

| | Uncrosslinked | | After 120° C./30 min. | |
|---|---|---|---|---|
| Example | Tensile (kPa) | Elongation (%) | Tensile (kPa) | Elongation (%) |
| 7 | 1200 | 1200 | 1500 | 1050 |
| 8 | 600 | 1175 | 700 | 1000 |
| 9 | 10500 | 550 | 11000 | 525 |
| 10 | 9500 | 550 | 7000 | 425 |
| 11 | 1000 | 1250 | 1000 | 1100 |
| 12 | 6000 | 725 | 6500 | 675 |
| 13 | 5000 | 775 | 6000 | 650 |

EXAMPLES 14-18

Tapes were made as in Example 1 except the monomers were 65 parts isooctyl acrylate, 13 parts butyl acrylate, and 22 parts acrylic acid, and various amounts of the hexamethoxymethyl melamine crosslinking agent were used as follows:

| Example | Parts of Crosslinking Agent |
|---|---|
| 14 | 0.1 |
| 15 | 0.2 |
| 16 | 0.4 |
| 17 | 0.6 |
| 18 | 0.7 |

Cleavage Peel Values from a glass plate and 180° Peel Values were measured after heating the bonded test specimens for various times and temperatures as indicated in Table D to provide various degrees of crosslinking. Some of the test specimens were conditioned at 38° C. and 100% relative humidity for 7 days before testing to indicate their resistance to the effects of moisture at elevated temperatures.

TABLE D

| | Crosslinking | | 180° Peel Value (N/dm) | | Cleavage Peel Value after conditioning (N/dm) | |
|---|---|---|---|---|---|---|
| Example | Temp. (°C.) | Time (min.) | Before Conditioning | After Conditioning | Breakaway | Continuing |
| 14 | 121 | 30 | 480 | 2 | 45 | 20 |
| 15 | 149 | 15 | 460 | 10 | 60 | 30 |
| 16 | 93 | 45 | 340 | 20 | 50 | 30 |
| 16 | 121 | 30 | 480 | 2 | 45 | 20 |
| 16 | 121 | 8 | 360 | 40 | 65 | 25 |
| 16 | 121 | 52 | 440 | 20 | 50 | 15 |
| 16 | 80 | 30 | 360 | 30 | 45 | 20 |
| 16 | 163 | 30 | 520 | 4 | 50 | 20 |
| 17 | 149 | 45 | 420 | 35 | 40 | 15 |
| 18 | 121 | 30 | 300 | 75 | 65 | 25 |

Each of the tapes of Examples 14-18 was tested for Static Shear Value after crosslinking as indicated in Table D. Each withstood 10,000 minutes without failure.

We claim:
1. A tape comprising a carrier web and a pressure-sensitive adhesive layer comprising a copolymer of
  (a) acrylic acid ester of nontertiary alcohol, the molecules of which have from 1–14 carbon atoms, at least a major proportion of said molecules having a carbon-to-carbon chain of 4–12 carbon atoms terminating at the hydroxyl oxygen atom, said chain containing at least about one-half the total number of carbon atoms in the molecule, said acrylic acid ester being per se polymerizable to a sticky, stretchable elastic adhesive polymer mass, and
  (b) at least one copolymerizable monoethylenic monomer selected from the group consisting of acrylic acid, methacrylic acid and itaconic acid,
wherein the improvement comprises:
  the copolymerizable monomer (b) comprises from 10 to 25 percent by weight of said monomers (a) and (b) and
  the adhesive layer includes in an amount within the range of about 0.1 to 0.8 percent by weight of the copolymer, a lower-alkoxylated amino formaldehyde condensate having $C_{1-4}$ alkyl groups, said copolymer being substantially uncrosslinked and hence retaining some tackiness until being heated.
2. A tape as defined in claim 1 wherein the formaldehyde condensate is hexamethoxymethyl melamine.

3. A tape as defined in claim 1 wherein the carrier web has a low-adhesion surface from which the adhesive layer can be easily peeled off.

4. A tape as defined in claim 3 wherein the carrier has low-adhesion surfaces on both faces, and the tape is wound upon itself in roll form.

5. A tape as defined in claim 4 wherein the two low-adhesion surfaces are different so that the adhesive layer preferentially adheres to one surface.

6. A tape as defined in claim 3 wherein the adhesive layer is adhered to one face of a foam strip and there is another pressure-sensitive adhesive layer adhered to the other face of the foam strip.

7. Method of making a pressure-sensitive adhesive tape comprising the steps of
    (1) exposing to ultraviolet radiation a mixture of monomers (a) and (b) as defined in claim 1 together with a photoinitiator to provide a partially-polymerized syrup having a coatable viscosity,
    (2) adding a crosslinking agent to the syrup,
    (3) coating this onto a carrier web, and
    (4) in an inert environment, exposing the coating to ultraviolet radiation to complete the polymerization to provide a pressure-sensitive adhesive layer,
wherein the improvement comprises:
the copolymerizable monomer (b) comprises 10 to 25 percent by weight of said monomers (a) and (b) and
the crosslinking agent is a lower-alkoxylated amino formaldehyde condensate in an amount within the range of about 0.2 to 0.8 percent by weight of the copolymer, said copolymer being substantially uncrosslinked and hence retaining some tackiness until being heated.

* * * * *

UNITED STATES PATENT AND TRADEMARK OFFICE
CERTIFICATE OF CORRECTION

PATENT NO. : 4,404,246

DATED : September 13, 1983

INVENTOR(S) : ROBERT R. CHARBONNEAU and GAYLORD L. GROFF

It is certified that error appears in the above—identified patent and that said Letters Patent is hereby corrected as shown below:

Column 5, Table B, line 50, last column, "13000" should be -- 1300 --.

Signed and Sealed this

First Day of May 1984

[SEAL]

Attest:

GERALD J. MOSSINGHOFF

Attesting Officer    Commissioner of Patents and Trademarks